(12) United States Patent
Calle et al.

(10) Patent No.: US 9,108,178 B2
(45) Date of Patent: Aug. 18, 2015

(54) ELONGATED MICROCAPSULES AND THEIR FORMATION

(75) Inventors: Luz M. Calle, Merritt Island, FL (US); Wenyan N. Li, Orlando, FL (US); Jerry W. Buhrow, Melbourne, FL (US); Stephen A. Perusich, Merritt Island, FL (US); Scott T. Jolley, Titusville, FL (US); Tracy L. Gibson, Melbourne, FL (US); Martha K. Williams, Titusville, FL (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 657 days.

(21) Appl. No.: 13/354,576

(22) Filed: Jan. 20, 2012

(65) Prior Publication Data

US 2012/0207921 A1  Aug. 16, 2012

Related U.S. Application Data

(60) Provisional application No. 61/442,477, filed on Feb. 14, 2011.

(51) Int. Cl.
| C09D 105/00 | (2006.01) |
| B01J 13/02 | (2006.01) |
| C08L 5/00 | (2006.01) |
| B05D 7/00 | (2006.01) |
| B01J 13/16 | (2006.01) |
| B01J 13/14 | (2006.01) |
| C23F 11/00 | (2006.01) |
| C09D 7/12 | (2006.01) |

(52) U.S. Cl.
CPC *B01J 13/16* (2013.01); *B01J 13/14* (2013.01); *C09D 7/1291* (2013.01); *C23F 11/00* (2013.01); *C09D 105/00* (2013.01)

(58) Field of Classification Search
CPC ........... C09D 105/00; B01J 13/02; C08L 5/00
See application file for complete search history.

(56) References Cited

U.S. PATENT DOCUMENTS

| 5,418,154 | A | * | 5/1995 | Aebischer et al. | ............. 435/182 |
| 5,596,051 | A | * | 1/1997 | Jahns et al. | ..................... 526/73 |
| 8,552,092 | B2 | * | 10/2013 | Xing et al. | .................... 523/208 |

OTHER PUBLICATIONS

White, SR et al. 2001. Autonomic healing of polymer composites. Nature 409:794-797.
Mookhoek, SD et al. 2009. A numerical study into the effects of elongated capsules on the healing efficiency of liquid-based systems. Computational Materials Science 47:506-511.
Sui, Y et al. 2010. Numerical simulation of capsule deformation in simple shear flow. Computers & Fluids 39:242-250.
Taylor, GI. 1934. The formation of emulsions in definable fields flow. Proceedings of the Royal Society of London. Series A. 146:501-523.
Fischer, P. 2007. Emulsion drops in external flow fields—the role of liquid interfaces. Current Opinion in Colloid & Interface Science. 12:196-205.

* cited by examiner

*Primary Examiner* — Randy Gulakowski
*Assistant Examiner* — Jeffrey Washville
(74) *Attorney, Agent, or Firm* — Michelle L. Ford; Hugh McTavish

(57) ABSTRACT

Elongated microcapsules, such as elongated hydrophobic-core and hydrophilic-core microcapsules, may be formed by pulse stirring an emulsion or shearing an emulsion between two surfaces moving at different velocities. The elongated microcapsules may be dispersed in a coating formulation, such as paint.

25 Claims, 17 Drawing Sheets

ELONGATED MICROCAPSULES AND THEIR FORMATION

CROSS-REFERENCE TO RELATED APPLICATIONS

This application claims the benefit under 35 U.S.C. §119 (e) of U.S. Provisional Application Ser. No. 61/442,477, filed on Feb. 14, 2011, the contents of which are incorporated herein by reference.

STATEMENT OF GOVERNMENT INTEREST

The invention described herein was made in the performance of work under a NASA contract and by an employee of the United States Government and is subject to the provisions of Public Law 96-517 (35 U.S.C. §202) and may be manufactured and used by or for the Government for governmental purposes without the payment of any royalties thereon or therefore. In accordance with 35 U.S.C. §202, the contractor elected not to retain title.

FIELD OF THE INVENTION

The present invention relates generally to microcapsules and their formation. More particularly, this invention is related to elongated microcapsules.

BACKGROUND OF THE INVENTION

Microcapsules have been used for various applications. Normally, microcapsules are synthesized in spherical or somewhat spherical shapes. Recently, microcapsules have been used for smart coatings for corrosion applications. For instance, the pH sensitive microcapsules disclosed by Li and Calle in 2009 NACE International conference paper 09499 and 2007 NACE International conference paper 07228, and in U.S. Pat. No. 7,790,225 B1 (Luz Calle et al., issued Sep. 7, 2010) have been used for the controlled release of a corrosion indicator, or a corrosion inhibitor, or a self-healing agent when corrosion occurs. Mechanically breakable microcapsules are also used in self-healing composite disclosed by White et al. in Nature, 2001, 409:794-797.

There are few disclosures on making elongated capsules (around or above 1 mm), but not on making elongated microcapsules (below 100 microns). For instance, Aebischer et al (U.S. Pat. No. 5,418,154) prepared elongated seamless capsules containing biological materials by extruding the capsule core content and the polymeric casting solution through two concentric bores. However, there are a number of shortcomings in this approach. The size of the capsule is limited by the size of the bores, which makes it difficult to form small microcapsules, i.e., smaller than 200 microns. The scale up of the process requires additional equipment set up, the cost of mass production can be very high and even forbidden for many industries, such as the coating industry or composite applications.

Thus, there exists a need for better techniques for synthesis of elongated microcapsules for producing microcapsules about or below 200 microns, as well as suitable for scale up for industrial production.

SUMMARY OF THE INVENTION

This invention permits formation of elongated microcapsules from an emulsion system. Microencapsulation techniques based on emulsion processes are often used to produce microcapsules by incorporating the core content in the dispersed phase, and forming solid walls around the dispersed phase droplets. Spherical, or somewhat spherically shaped, microcapsules are normally formed due to the interfacial tension between the dispersed phase and the continuous phase.

In the present invention, elongated microcapsules, such as elongated hydrophobic-core and hydrophilic-core microcapsules, may be formed by pulse stirring an emulsion or shearing an emulsion between two surfaces moving at different velocities. The term "velocities" throughout this document refers to vector velocity, including a directional component. Thus, two surfaces moving at different velocities may have the same absolute velocity value but different directions.

One embodiment of the invention provides a composition comprising capsules having a solid shell and an interior core; wherein at least a portion of the capsules are elongated microcapsules.

Another embodiment provides a method of treating a surface comprising: (a) applying a coating to the surface, wherein the coating comprises elongated microcapsules dispersed in a coating vehicle, the elongated microcapsules having an interior content comprising a corrosion indicator, a corrosion inhibitor, a self healing agent, or a film-forming compound; and (b) releasing the interior content of the elongated microcapsules in the presence of corrosion or upon physical trauma.

Another embodiment provides a method of detecting corrosion comprising: (a) applying a coating on a metal-containing surface, the coating comprising elongated microcapsules dispersed in a coating vehicle, the microcapsules comprising an indicator; (b) releasing the indicator; and (c) detecting the presence of corrosion using the indicator; wherein releasing the indicator is caused by an alkaline condition, resulting from corrosion, that breaks down shells of elongated microcapsules exposed to the alkaline condition; or by physical trauma.

Another embodiment provides a method of forming a composite material comprising: incorporating elongated microcapsules into a matrix to form a composite material comprising elongated microcapsules dispersed in the matrix; wherein the elongated microcapsules have a solid shell and an interior core, wherein the interior core comprises a self-healing compound.

Another embodiment provides a method of healing a composite material, the composite material comprising: a matrix; and elongated microcapsules dispersed in the matrix; wherein the elongated microcapsules have a solid shell and an interior core, wherein the interior core comprises a self-healing compound; the method comprising: (a) releasing the self-healing compound from the elongated microcapsules in response to physical trauma that fractures or tears the composite material and breaks some of the elongated microcapsules, wherein the self-healing compound heals the fracture or tear.

Another embodiment provides a composite material comprising: a matrix; and elongated microcapsules dispersed in the matrix; wherein the elongated microcapsules have a solid shell and an interior core, wherein the interior core comprises a self-healing compound. In one embodiment, the matrix comprises a polymer.

Another embodiment provides a method for forming elongated microcapsules, comprising: (a) forming an emulsion; (b) shearing the emulsion between two surfaces moving at different velocities to form a sheared emulsion; and (c) forming solid shells around droplets in the emulsion to form elongated microcapsules. The steps may be performed simultaneously. For instance, the steps of forming an emulsion, shearing the emulsion, could be executed by placing components of the mixture between the two surfaces and then moving the surfaces at different velocities.

Another embodiment provides a method for forming elongated microcapsules, comprising: (a) forming an emulsion; (b) stirring the emulsion using pulsed stirring; and (c) forming solid shells around droplets in the emulsion to form elongated microcapsules.

DETAILED DESCRIPTION OF THE INVENTION

Figure 1:
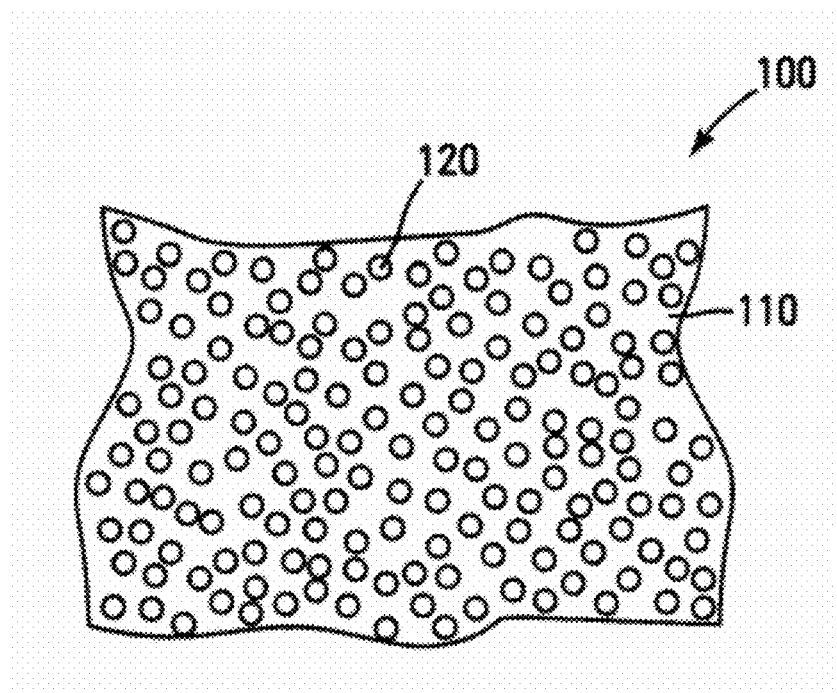
FIG. 1 illustrates a coating, according to an embodiment.

In the following detailed description of the invention, reference is made to the accompanying drawings that form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and chemical changes may be made without departing from the scope of the present invention. The following detailed description is, therefore, not to be taken in a limiting sense, and the scope of the present invention is defined only by the appended claims and equivalents thereof.

Elongated microcapsules may be more efficient at delivering their contents, e.g., in response to breaking down when exposed to corrosion (e.g., a basic condition) or to a mechanical trauma, because an elongated microcapsule may be able to release more of their content, such as a healing agent, corrosion indicator, and/or corrosion inhibitor, than a spherical microcapsule when a crack is initiated in a coating. Elongated microcapsules are particularly suited for releasing their contents in response to a crack or to a mechanical trauma (e.g., an impact or scratch). A crack is more likely to intersect an extended hollow fiber at some point than a sphere of the same diameter as the hollow fiber. Likewise, it is more likely to intersect an elongated capsule than a spherical capsule with the same diameter as the short axis of the elongated capsule. A trauma or mechanical force is also more likely to break an elongated capsule than a spherical capsule, because the elongated capsule has flat, and in some cases concave, surfaces while a perfect sphere has only convex surfaces, which are more structurally stable than flat or concave surfaces.

FIG. 1 illustrates a coating 100, according to an embodiment. Coating 100 includes a coating vehicle 110, such as clear or opaque paint, aqueous gel, water, etc., having microcapsules 120 dispersed within the coating vehicle 110, e.g., by mixing, etc. For embodiments including the aqueous gel, coating 100 is a temporary coating. For another embodiment, coating vehicle 110 may be a solvent, such as an aliphatic hydrocarbon, e.g., aliphatic petroleum distillates.

Figure 2:
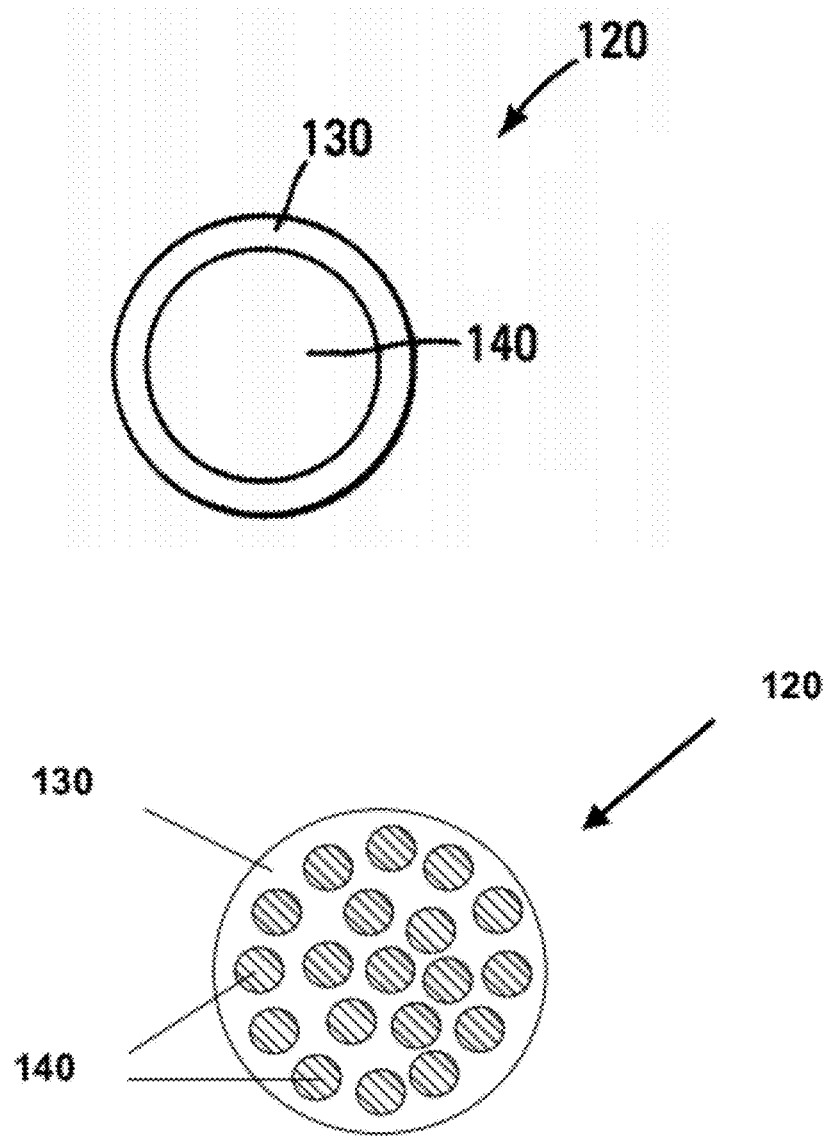
FIG. 2 illustrates a spherical microcapsule, according to another embodiment.

FIG. 2 is an enlarged view of a microcapsule 120, according to another embodiment. Microcapsule 120 includes a shell 130 that contains an interior core 140. The interior core is simply the volume enclosed by the shell. The interior core may comprise, in particular embodiments, a film-forming compound, an indicator, or a corrosion inhibitor, or various combinations thereof. A suitable film-forming compound may be a clear varnish, such as an acrylic varnish. A suitable indicator may be a pH indicator that changes color over the alkaline region, e.g., pHs from about 8 to about 10, such as phenolphthalein. Another suitable indicator is one that fluoresces, such as 7-hydroxycoumarin or coumarin, in the presence of, or upon the oxidation of, a metal or in the presence of or upon the formation of a metal cation complex. A suitable corrosion inhibitor may be sodium nitrate, camphor, or polyamine fatty acid salts. Other corrosion inhibitors include zinc chromate; strontium chromate; zinc phosphate; phosphate molybdate; phenylphosphonic acid; sodium molybdate; calcium zinc phospho-molybdate; cerium salts, such as cerium nitrate or cerium oxide; lanthanum nitrate; vanadates; sodium silicate magnesium silicate; sodium mannitol borate; sodium sorbitol borate; 2-aminoethoxydiphenyl borate; and sodium nitrite. Other corrosion inhibitors include hexamine, benzotriazole, phenylenediamine, dimethylethanolamine, polyaniline, cinnamaldehyde, condensation products of aldehydes and amines (imines), hydrazine, and ascorbic acid. The term "film-forming compound" refers to a substance or compound that when encapsulated exists as a liquid, but when released from a capsule forms a solid permanent film on a surface. The formation of a solid film may be by reaction of two components. In this case, the two components may be found in separate capsules so that they do not react unless both capsules break, or one component may be in microcapsules and the other reacting component (which may be a catalyst) in the matrix outside the microcapsules. Examples include (1) epoxy and its hardeners, such as bisphenol-A or F type of epoxy resin and polyamine monomers, or thiol hardeners; (2) polysiloxane resins and their catalyst, such as organotin catalysts; (3) a solution or suspension of acrylic resin based on derivatives of acrylic acid and methacrylic acid; and (4) polyurethane monomers, where one monomer contains at least two isocyanate groups and the other contains at least two hydroxyl (alcohol) groups, and a catalyst, such as tertiary amines (e.g., dimethylcyclohexylamine) or organometalic compounds (e.g, dibutylintin dilaurate or bismuth octanoate). A pair of reacting components, such as isocyanate monomers and hydroxyl monomers for polyurethane formation, or a reacting component and a catalyst may be separated into different microcapsules or one in microcapsules and the other in the matrix. Another group of film-forming compounds dry or react when exposed to air after they are released from microcapsules and thereby form a solid film. An example is drying oil, which may be a triester of unsaturated fatty acids with glycerol. Linseed oil is an example of a drying oil. On exposure to air, the highly unsaturated fatty acid chains react with oxygen and cross-link to give a tough transparent polymer. Varnish also contains such drying oils.

The film-forming compound, by forming a solid film on the surface, can seal the surface, and thereby protect it from water and oxygen and prevent further corrosion.

The elongated microcapsules may also comprise in their interior core a self-healing compound. A self-healing compound is a compound that on its own or on reaction with another component heals a crack or break in a material. Many of the film-forming compounds are also self-healing compounds. One example of a self-healing compound is a monomer or pre-polymer that polymerizes when released from the microcapsules. One example is dicyclopentadiene (DCPD) in the microcapsules, where Grubb's catalyst is embedded in the matrix, so when the microcapsules release the DCPD, it polymerizes by contact with the catalyst to form a cross-linked polymer network (White et al., 2001, Nature 409:794-797). Some of the film-forming compounds discussed above are also self-healing compounds. Self-healing may be used where the matrix is a polymer, which may be cross-linked by the polymer formed from the self-healing compound. Also, like the film-forming compounds, two reacting self-healing compounds may be found in separate microcapsules, so the two components react when both populations of microcapsules break and release their interior core content.

Figure 6:
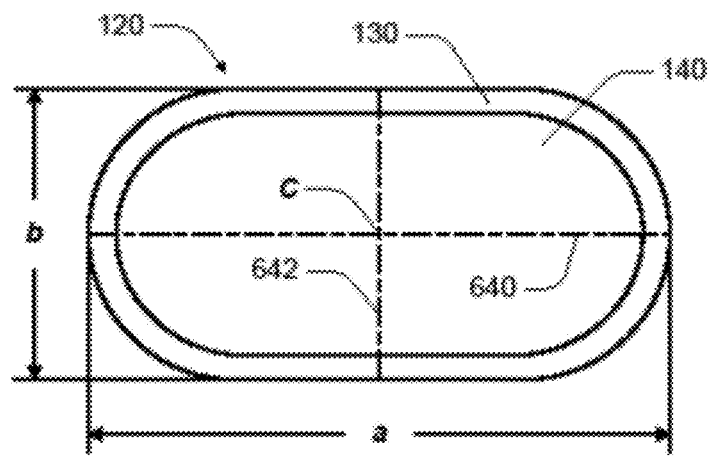
FIG. 6 illustrates an embodiment of an elongated microcapsule.

FIG. 6 illustrates a cross-section of an elongated microcapsule 120. Elongated microcapsule 120 may have a longitudinal axis 640 and a transverse axis 642 that may be perpendicular (e.g., substantially perpendicular) to longitudinal axis 640, where longitudinal axis 640 and a transverse axis 642 may pass through a center C of elongated microcapsule 120. Longitudinal axis 640 and transverse axis 642 respectively have lengths a and b. An aspect ratio of elongated microcapsule 120 may be defined as a/b, where the aspect ratio a/b defines the elongation of elongated microcapsule 120 and where the aspect ratio a/b is greater than one. Note that the greater the aspect ratio, the greater the elongation. Elongated microcapsule 120 may be an oil-core microcapsule for some embodiments.

The term "elongated microcapsules" refers to capsules where the aspect ratio a/b is greater than 1.0, and where the shorter dimension b is about or less than 100 microns. In some embodiments, the aspect ratio is greater than 1.1, greater than 1.2, greater than 1.3, greater than 1.4, greater than 1.5, greater than 1.7, greater than 2.0, or greater than 5.

The interior core of the elongated microcapsules may comprise a colorimetric or fluorescent indicator that changes color or fluoresces when corrosion occurs (e.g. when exposed to corrosion product). In other embodiments, it may comprise a corrosion inhibitor or a film-forming compound.

In some embodiments, shell 130 is broken down or disintegrates in the presence of a base, e.g., at a pH above about 8, and releases interior core 140. Microcapsules having shells that break down under basic, or alkaline, conditions are known in the art. For example, a microcapsule 120 may be formed by forming an oil (e.g., toluene or vegetable oil) in water emulsion. A surfactant, such as xanthan gum, Attagel 40 (available from Engelhard Corp., Iselin, N.J., USA), Petro BAF (available from Akzo Nobel Chemicals, Inc., Chicago, Ill., USA), and/or Reax 83 (available from MeadWestvaco Corp., Stamford, Conn., USA) is added to the emulsion to evenly distribute the oil in the water. A pre-polymer, such as an amino resin pre-polymer, a cross-linking agent having one or more ester or thioester groups that are broken down under basic conditions, and interior core 140 are added to the oil phase. An initiator or catalyst, such as an inorganic acid, is added to the water phase. The oil-in-water emulsion is heated, causing a polymerization reaction to occur at the water-oil interface, which forms solid shell 130 around interior core 140. It is the interaction of alkaline conditions with functional groups of the cross-linking agent that causes shell 130 to break down under alkaline conditions. Alternatively, interior core 140 can be released under physical stress, such as by scratching or compressing coating 100 on a surface.

For one embodiment, coating 100 is temporarily applied to a metal-containing surface, e.g., by spraying, brushing, or rolling, to determine whether corrosion has occurred. For this embodiment, coating vehicle 110 may be an aqueous gel, and interior core 140 may include a suitable corrosion indicator, such as the colorimetric or fluorescent indicator, as described above. In the presence of corrosion, the shells 130 of the microcapsules 120 break down, releasing the indicator. The indicator will change color or fluoresce to indicate the presence of corrosion. Coating vehicle 110 is not limited to an aqueous gel, but can be a clear paint or varnish, opaque paint or varnish, etc. It may be substantially permanently applied to the metal-containing surface by spraying, brushing, or rolling. For one embodiment, coating 100 may be applied substantially permanently to a bare metal surface as a primer coat that is clear coated. Another example of a temporary coating is a water suspension of microcapsules 120.

In some embodiments, interior core 140 may include the indicator, a corrosion inhibitor, a film-forming compound, or some combination thereof. If the shells 130 break down, due to exposure to a basic pH condition, the interior core 140 is released, and the corrosion inhibitor acts to prevent further corrosion, while the indicator indicates the location of corrosion. A self healing agent or film-forming compound can repair coating damage to help prevent further corrosion or damage to the metal.

In another embodiment, a physical trauma, such as a scratch or impact, to the coating may act to expose the metal. The trauma can also break shells 130 to release the interior core 140. Elongated microcapsules are particularly suited for release in response to physical trauma, because the elongated microcapsules are more susceptible to breakage due to physical force than spherical microcapsules are. Release of a film-forming compound, and/or self healing agents in the interior core 140 after physical trauma can seal or protect the metal-containing surface before any corrosion has happened.

Note that if corrosion occurs at locations away from the trauma location, e.g., due to small defects in the coating, such as air bubbles, corrosion inhibitor and film-forming compound will be released due to the shells 130 breaking down in the presence of the basic pH condition resulting from corrosion. In other embodiments, the indicator will indicate the presence of the corrosion.

For one embodiment, a portion of microcapsules 120 in coating 100 may contain a corrosion inhibitor, and another portion of microcapsules 120 may contain a corrosion indicator, and another portion may contain a film-forming compound.

In some embodiments, microcapsules 120 having different contents are randomly distributed within coating vehicle 110 so that microcapsules 120 having the different functions of indicating, inhibiting, and/or film-forming or sealing, may be adjacent to each other, as well as microcapsules 120 having like functions being adjacent to each other.

One embodiment of the invention provides a composition comprising capsules having a solid shell and an interior core; wherein at least a portion of the capsules are elongated microcapsules.

In particular embodiments the interior core of the elongated microcapsules comprises a colorimetric or fluorescent indicator that changes color or fluoresces when exposed to corrosion or the interior core comprises a corrosion inhibitor, a film-forming compound, or a self-healing compound. For instance, the colorimetric or fluorescent indicator may change color or become fluorescent when exposed to alkaline pH resulting from corrosion, or when exposed to metal ions resulting from corrosion.

In particular embodiments the composition is adapted to release the interior core content of the microcapsules in response to physical trauma (i.e., mechanical forces). For example, the trauma may be an impact or a scratch.

In particular embodiments, the composition is a coating composition adapted to cover and adhere to a metal-containing surface. This refers to a coating that is permanent or semi-permanent, such as a paint, varnish, or sealant.

In particular embodiments, the composition is an adherent coating on a metal-containing surface.

In particular embodiments, the solid shell of the elongated microcapsules comprises a polymer, wherein the shell does not comprise a component that breaks down under basic pH.

In specific embodiments, the shell of the microcapsules breaks down when exposed to alkaline conditions. An example is shells made with a cross-linker that contains ester or thioester bonds. The ester and thioester bonds hydrolyze at an appreciable rate at alkaline pH, causing the shell to break down and release the interior core volume.

Thus, in more specific embodiments, the solid shell comprises polymer segments interconnected with each other by a cross-linker, wherein the cross-linker hydrolyzes in an alkaline condition. An example is penta erythritol tetrakis (3-mercaptopropionate) (PTT). In other embodiments, the solid shell may not comprise a polymer. For instance, microcapsules with a wax shell can be made by methods known in the art.

Preferably, at least 50 volume percent of the capsules in the composition are elongated microcapsules. In other specific embodiments, at least 30 volume percent, at least 40 volume percent, at least 60 volume percent, at least 70 volume percent, at least 80 volume percent, or at least 90 volume percent of the capsules are elongated microcapsules.

One embodiment provides a method for forming elongated microcapsules, comprising: (a) forming an emulsion; (b) stirring the emulsion using pulsed stirring; and (c) forming solid shells around droplets in the emulsion to form elongated microcapsules.

As described in Example 1 below, droplet size in an emulsion is directly affected by mixing speed: the higher the mixing speed, the smaller the dispersed phase droplets are. In an emulsion system with intermediate stability, droplets of the dispersed phase will start to coalesce to form bigger droplets. This can happen after mixing is slowed or stopped. If the encapsulation occurs during this coalescence phase, elongated microcapsules are formed. Pulsed stirring, as described above, is one way to achieve this.

In a specific embodiment of the pulse stirring method, the method further comprises harvesting the elongated microcapsules, and mixing the elongated microcapsules with one or more other components to form an adherent coating composition.

In specific embodiments, the pulsed stirring comprises repeating a process of mixing the emulsion for a particular time and stopping the mixing for a particular other time. In other embodiments, the pulsed stirring comprises mixing the emulsion at one faster mixing speed for a particular time, and then mixing at a second slower mixing speed for a particular other time. The cycle of those two steps (faster and slower mixing, or mixing and stopping mixing) may occur only once or may optionally be repeated two or more times.

The emulsion may comprise hydrophobic droplets dispersed in a hydrophilic phase, or hydrophilic droplets dispersed in a hydrophobic phase.

Figure 7:
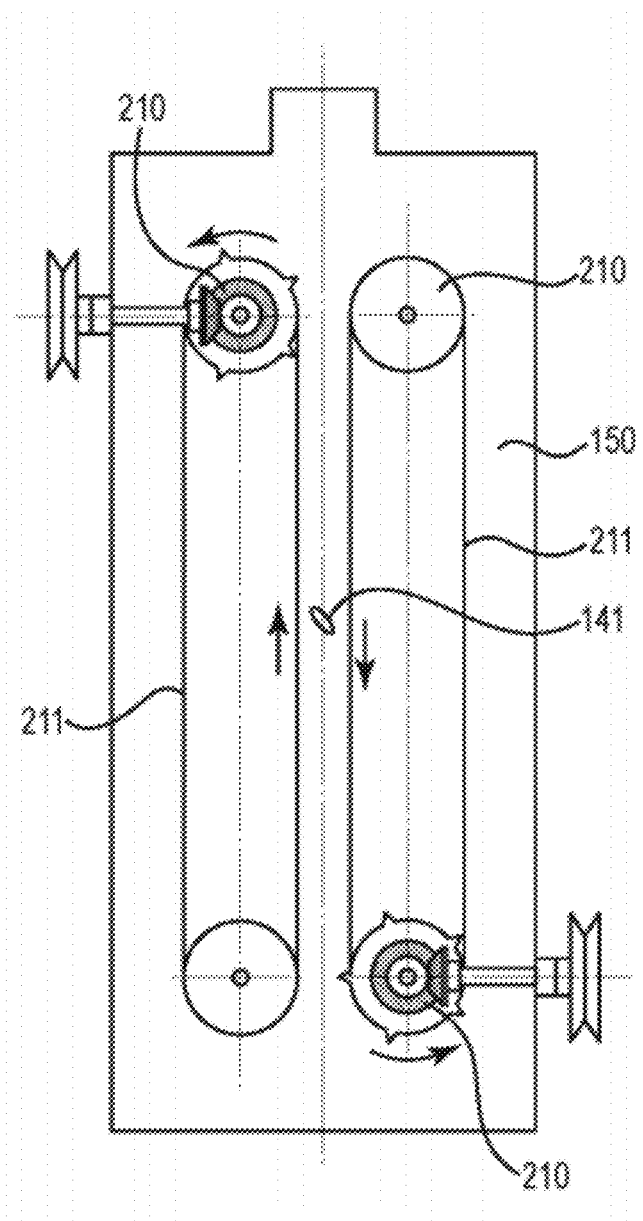
FIG. 7 illustrates a parallel band apparatus for generating simple shear of droplets.

Elongated droplets in an emulsion and microcapsules from the droplets, are formed with a balance between two main forces. The interfacial stress (surface tension) and the viscous force (shear caused by flow) determine the deformation and stability of a droplet in a shear field or a flowing liquid phase. Shear stress and the viscous force can be generated by stirring a fluid, particularly by the flow along the surface of a container containing the fluid. It can also be generated by the relative movement of two surfaces. The parallel band apparatus shown in FIG. 7 is one apparatus that can generate these shear forces. Rollers 210 move fabric bands 211. The two fabric bands 211 move in opposite directions and so place a shear force on droplet 141 that is located between the two surfaces 211.

Figures 8A, 8B, 8C:
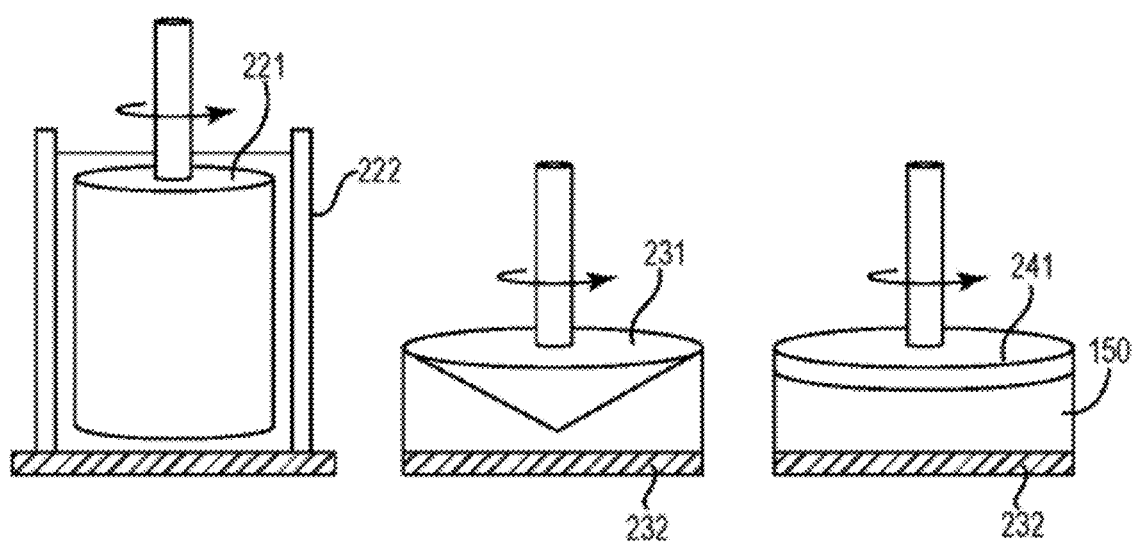
FIG. 8 illustrates three devices for generating shear forces and for use in producing elongated microcapsules.

FIG. 8 shows three other apparatuses 200 for generating shear forces and microcapsules. Panel (a) shows two concentric cylinders. Mixture 150 between the two cylinders 221 and 222, where the mixture contains the emulsion, i.e. droplets of one type of liquid dispersed in a continuous phase of liquid of another type. Panel (b) shows a cone-and-plate apparatus with cone 231 and plate 232. Alternatively, the plate 232 could be in the form of another cone with faces parallel to those of cone 231. Panel (c) shows a parallel plate apparatus with plates 241 and 232. In each case, in one embodiment, one surface moves and the other is stationary. For instance, cylinder 221, cone 231, and plate 241 may rotate, while cylinder 222 and plates 232 are stationary. Alternatively, both interacting surfaces of each apparatus could move but in opposite directions or in the same direction at different absolute velocities.

Thus, one embodiment of the invention provides a method for forming elongated microcapsules, comprising: (a) forming an emulsion; (b) shearing the emulsion between two surfaces moving at different velocities to form a sheared emulsion; and (c) forming solid shells around droplets in the emulsion to form elongated microcapsules. Some or all of the steps can be carried out sequentially, or some or all of the steps can be carried out together. For instance, all of the components can be added to the same container and immediately sheared, so the mixing, forming an emulsion, and shearing the emulsion occur together. If the initiator was added at the same time as the other components, the forming solid shells around droplets also can be said to begin at the same time that the other steps occur.

Figure 9:
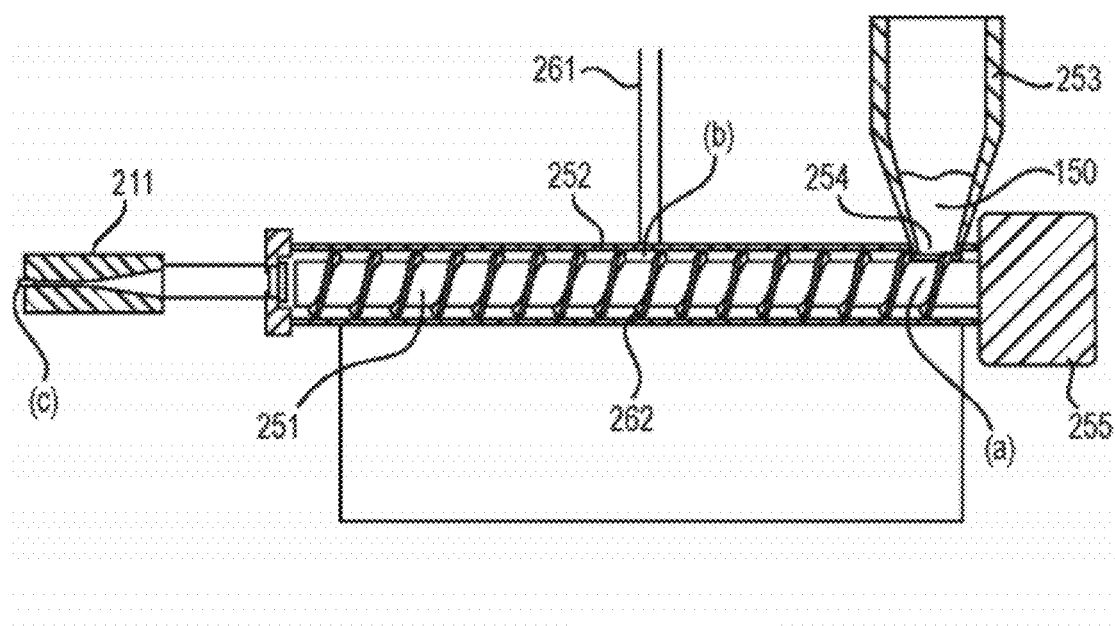
FIG. 9 is a diagram of a screw-in-barrel apparatus for continuous production of elongated microcapsules.

In specific embodiments, the elongated microcapsules are formed continuously. One apparatus for this purpose is a screw and barrel type apparatus, as shown in FIG. 9. A polymer extruder is one example of this apparatus, and it can be used or modified to perform this operation. The screw 251 is positioned within barrel or cylinder 252. The mixture 150 flows between the screw and the barrel, and rotation of the screw can move the mixture 150 from point (a) at the right of FIG. 9 to point (c) at the left. The mixture may be formed in hopper 253 and added to the apparatus through feed throat 254 at point (a). The screw is rotated by drive unit 255 to transport the mixture toward point (c). The motion of the screw in the barrel, in addition to transporting the mixture, also forms a sheared emulsion, by virtue of the screw moving relative to the wall of the barrel and shearing the emulsion between those two surfaces. A feeder 261 may be positioned at an intermediate point (b) and an initiator may be added at this point (b) through the feeder 261 to initiate formation of solid shells around the sheared droplets in the sheared emulsion. Elongated microcapsules are collected at point (c).

At the intermediate point (b) of the apparatus, the mixture can be treated to initiate formation of solid shells around the droplets to form elongated microcapsules. The treatment can be, e.g., heating or adding an initiator through a passageway of the outer barrel, or both. Alternatively, the treatment can be at point (a), e.g. by adding the initiator with the other components to form the mixture and then quickly shearing the mixture to form a sheared emulsion with the initiator in it.

Other apparatuses or geometries for carrying out continuous production of elongated microcapsules can also be used. For instance, the mixture can be transported through a relatively narrow channel at a constant rate, while at different points of the channel it may be rapidly stirred, and then the stirring stopped as the mixture continues to move linearly downstream. At the beginning point or at an intermediate point along the channel, initiation of forming the solid shells can be performed.

Shell formation can be initiated by adding an initiator, or by a treatment, such as raising or lowering the temperature in certain cases. The initiator can be a catalyst, such as sulfuric acid or another acid, which is not consumed in the polymerization reactions described in the Examples, or it could be a reagent that is consumed, such as a pre-polymer or cross-linker or monomer for a polymerization or cross-linking reaction, or ammonium persulfate for polymerization of polyacrylamide.

Thus, one embodiment of the methods comprises transporting the mixture in space from point a to point b to point c, wherein the sheared emulsion is formed between points a and c; treating the sheared emulsion at point a or b to initiate formation of the solid shells; and harvesting elongated microcapsules at point c.

In one embodiment, the two surfaces moving at different velocities are a screw inside a barrel, where the screw and barrel rotate relative to each other. The rotation may be due to absolute rotation of one surface with the other surface stationary, e.g., rotation of the screw inside a stationary barrel.

In another embodiment, the two surfaces moving at different velocities are a shaft and a tube (e.g., a rotating shaft and a stationary tube), a disc and a plate (e.g., a rotating disc and a stationary plate), a cone and a plate or a second cone (e.g., a rotating cone and a stationary plate), and a screw and a barrel (e.g., a rotating screw and a stationary barrel).

In one embodiment, the method involving shearing the emulsion between two surfaces moving at different velocities comprises harvesting the elongated microcapsules, and mixing the elongated microcapsules with one or more other components to form an adherent coating composition. A "coating composition" refers to a composition that is adapted to form a permanent or semi-permanent coating on a surface, e.g., a paint, varnish, or sealant.

In specific embodiments of the methods, the emulsion comprises hydrophobic droplets in a hydrophilic phase, or hydrophilic droplets in a hydrophobic phase.

Another embodiment of the invention provides a method of treating a surface comprising: (a) applying a coating to the surface, wherein the coating comprises elongated microcapsules dispersed in a coating vehicle, the elongated microcapsules having an interior content comprising a corrosion indicator, a corrosion inhibitor, or a film-forming compound; and (b) releasing the interior content of the elongated microcapsules in the presence of corrosion or upon physical trauma.

In one embodiment, step (b) comprises releasing the interior content of the elongated microcapsules in the presence of corrosion wherein the release is caused by an alkaline condition, resulting from corrosion, that breaks down shells of elongated microcapsules exposed to the alkaline condition.

In another embodiment, step (b) comprises releasing the content of the elongated microcapsules in response to physical trauma.

Figure 3:
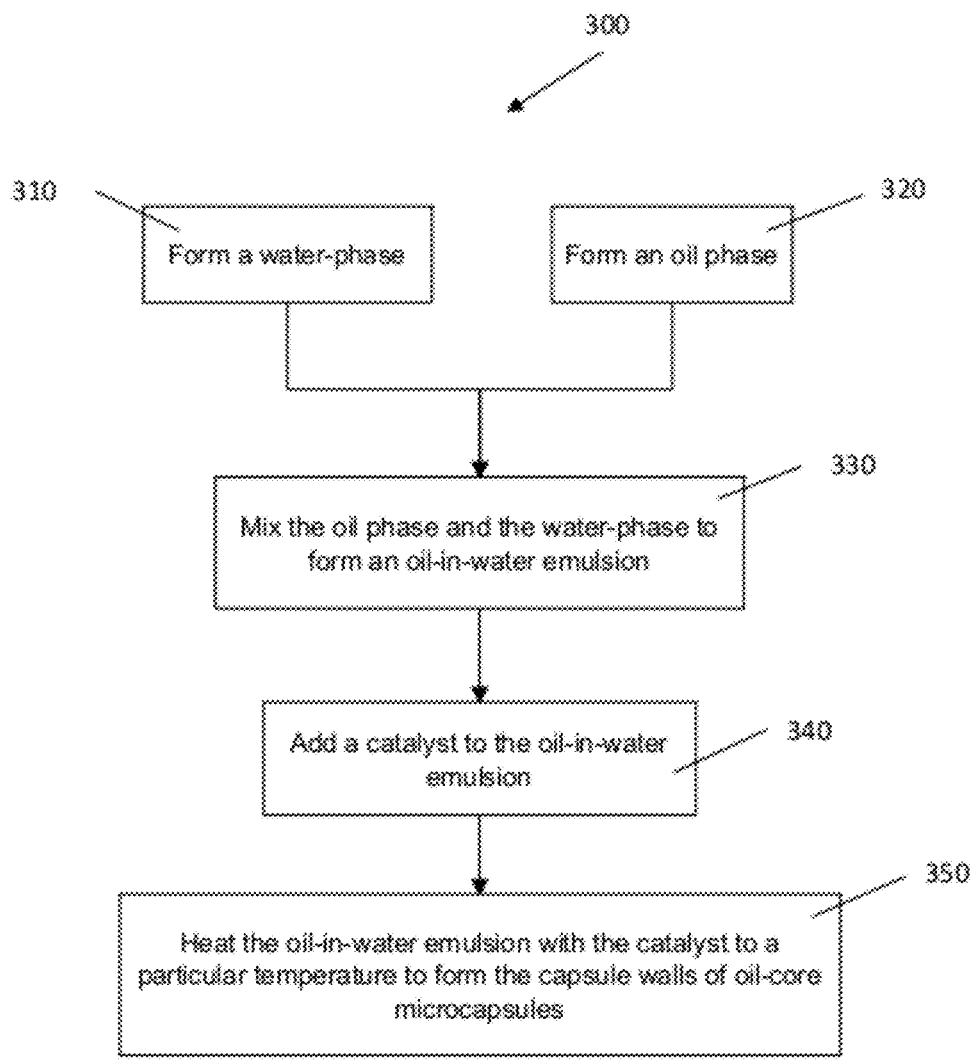
FIG. 3 presents a flowchart of a method for forming hydrophobic-core microcapsules, according to another embodiment.

It was found that elongated oil-core microcapsules could be formed according to process 300 of FIG. 3. For example, the water phase in step 310 may be prepared by respectively dissolving water-soluble surfactants, such as xanthan gum, Petro BAF powder, and ATTAGEL® 40, in the water one at a time, while stirring. For example, the water phase may comprise, consist of, or consist essentially of about 97.7 percent water, about 0.1 percent xanthan gum, about 0.2 percent Petro BAF, and about 2.0 percent ATTAGEL® 40, where the percents are mass percents. The oil phase formed in step 320 was prepared by adding shell-forming compound, such as CYMEL® U80, to toluene and ethanol and stirring, e.g., using the Powergen 500 homogenizer, until mixed. For example, the oil phase may comprise, consist of, or consist essentially of about 12.8 percent CYMEL® U80, about 59.8 percent toluene, and about 27.4 percent ethanol, where the percents are mass percents. The oil phase is dispersed into the water phase by stirring to make the oil-in-water emulsion in step 330, e.g., where the oil-in-water emulsion may comprise, consist of, or consist essentially of about 31 percent, by mass, oil phase and about 69 percent, by mass, water phase. A catalyst, such as 4N $H_2SO_4$ may be added in step 340, e.g., a drop at a time, to the oil-in-water emulsion, while stirring. The emulsion may then be heated in step 350 to initiate an interfacial polymerization reaction, thereby forming elongated oil-core microcapsules.

Figure 4:
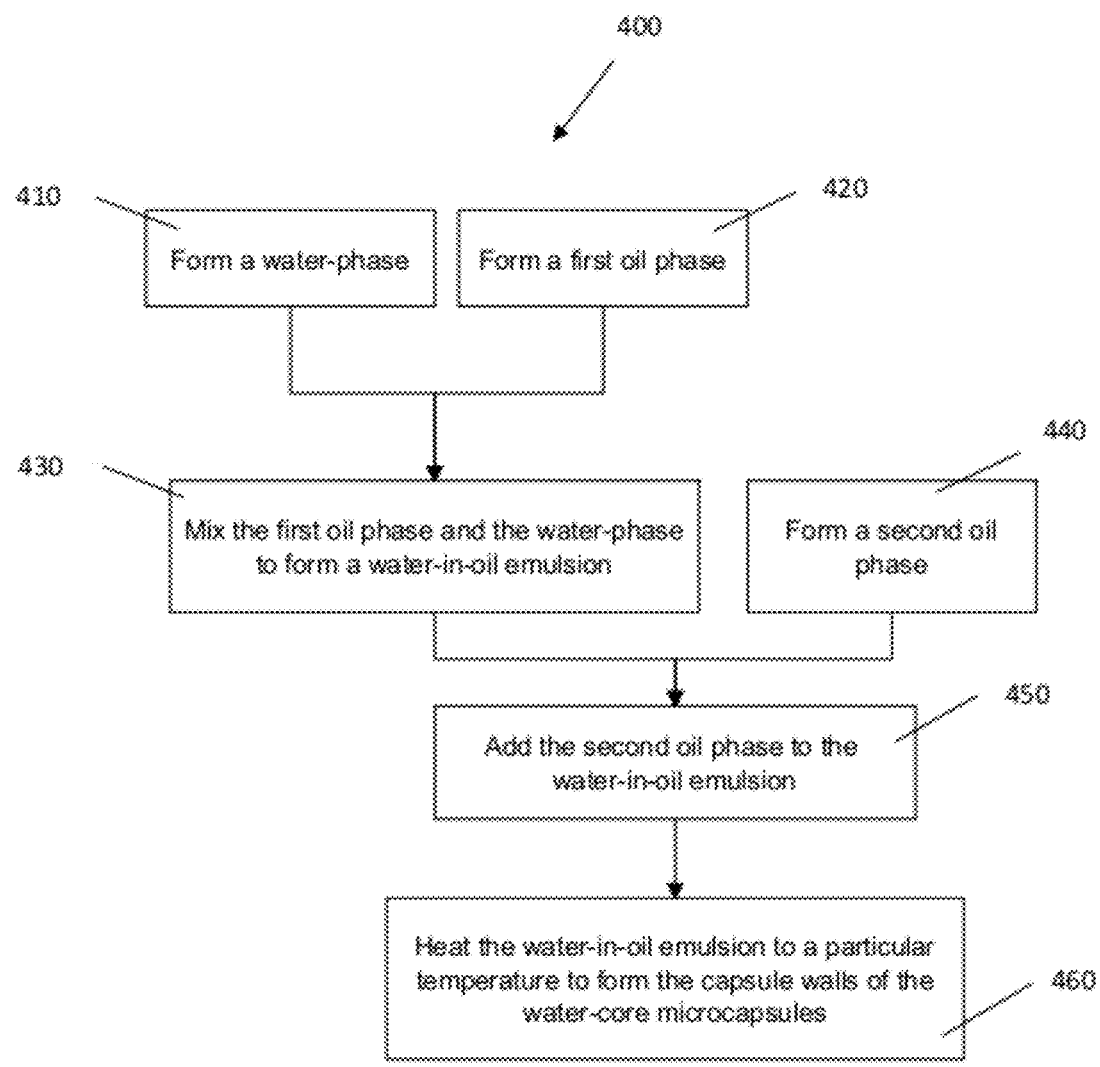
FIG. 4 presents a flowchart of a method for forming hydrophilic-core microcapsules, according to another embodiment.
Figure 5:
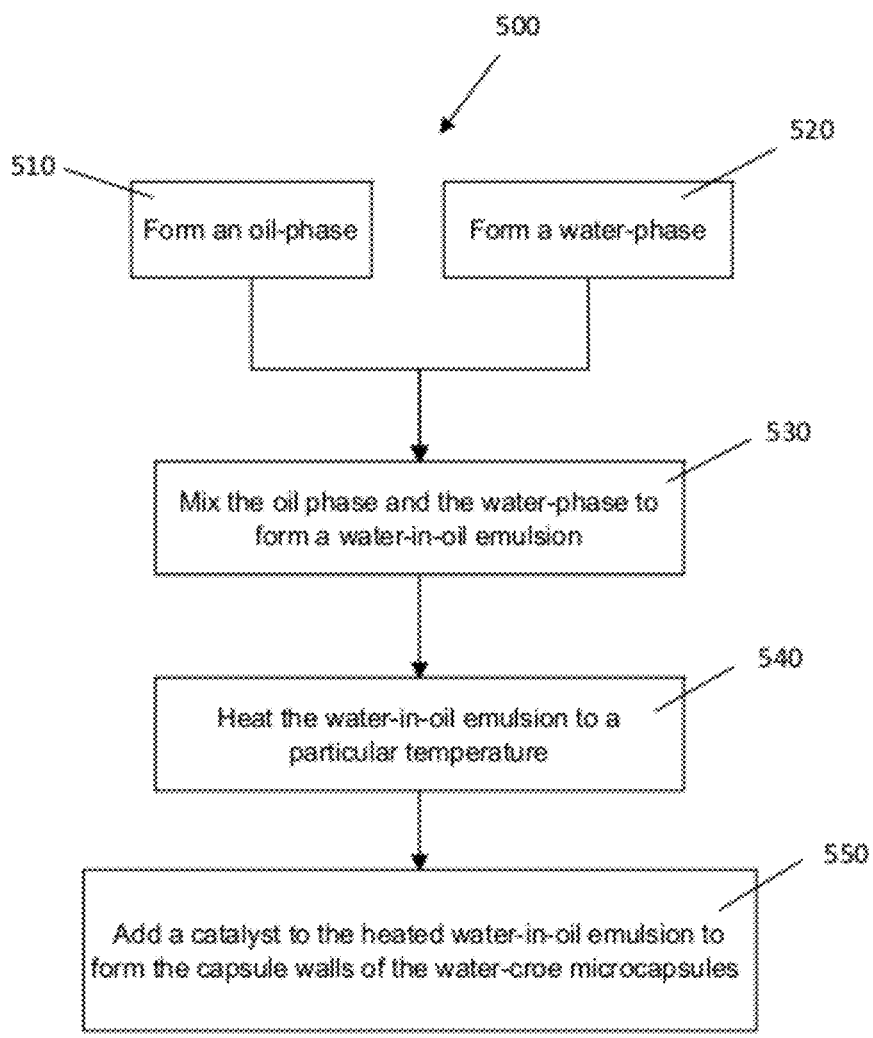
FIG. 5 presents a flowchart of a method for forming hydrophilic-core microcapsules, according to another embodiment.

Hydrophilic core microcapsules can be formed by processes shown in the flow charts of FIGS. 4 and 5. In this case, the shell forming compound may be in the oil phase. A water-soluble catalyst, such as H2SO4 can be added to start the reaction; it will partition to the aqueous phase and thereby initiate polymerization of the shell-forming compound, such as CYMEL U80, at the oil-water interface. Alternatively, hydrophilic core microcapsules can be formed with a more water-soluble shell-forming compound. For instance, melamine formaldehyde prepolymer or urea formaldehyde prepolymer can be used as the shell-forming compound.

It should be noted that the oil phase used during the formation of some oil-core microcapsules included a shell-forming compound having a suitable cross-linking agent, such as penta erythritol tetrakis (3-mercaptopropionate) (PTT). This cross-linking agent results in a desirable combination of the pH sensitivity and the structural integrity of the shell. That is, the cross-linking agent provides one or more ester groups that are broken down under basic conditions, thus enabling the shell of the microcapsule to be broken down when exposed to a basic (alkaline) condition. Note that the cross-linking agent may be eliminated from the shell-forming compound in the oil phase during the formation of the elongated oil-core microcapsules in Example 1. For example, in Example 1, Table 2, the shell-forming compound contains the pre-polymer CYMEL® U80 without the cross-linking agent. As such, the elongated oil-core microcapsules cannot be broken down when exposed to a basic (alkaline) condition. However, the shell of the elongated microcapsules thus formed will be thinner and more brittle and can be broken mechanically to release their content.

In addition, the oil-in-water emulsion used in the formation of the elongated microcapsules in Example 1 was less stable, e.g. a poorer dispersion of oil-phase droplets within the emulsion where the droplets more likely combine with each other, owing to the elimination of a surfactant, e.g., REAX 83A®, in the water phase used to promote the stability of the emulsion.

The thinner more brittle shell, resulting from the elimination of the PTT, causes the microcapsule to be more susceptible to breakage by mixing during the encapsulation process. This causes the formation of elongated microcapsules. In addition, the less stable emulsion, resulting from the elimination of REAX 83A®, produces oil-phase droplets of varying size in the emulsion that are constantly forming, deforming, and breaking. Under these conditions, some of the oil-phase droplets were deformed into elongated shapes that lasted long enough (as the continuous phase is viscous) to form the capsule shell. Some capsules are also broken after the capsule walls are formed and release some of the pre-polymer to form tail-like structures that ultimately form elongated microcapsules.

In another example, the water phase is prepared by respectively dissolving xanthan gum, Petro BAF powder, and ATTAGEL® 40, in the water one at a time, while stirring. For example, the water phase may comprise, consist of, or consist essentially of about 97.7 percent water, about 0.1 percent xanthan gum, about 0.2 percent Petro BAF, and about 2.0 percent ATTAGEL® 40, where the percents are mass percents. The oil phase was prepared by adding CYMEL® U80 to toluene and stirring, e.g., using the Powergen 500 homogenizer, until mixed. For example, the oil phase may comprise, consist of, or consist essentially of about 26.3 percent CYMEL® U80 and about 73.7 percent toluene, where the percents are mass percents. The oil phase is dispersed into the water phase by stirring to make the oil-in-water emulsion, e.g., where the oil-in-water emulsion comprises, consists of, or consists essentially of about 43 percent, by mass, oil phase and about 57 percent, by mass, water phase. A catalyst, such as 4N $H_2SO_4$, may be added dropwise to the oil-in-water emulsion while stirring. The emulsion may then be heated to initiate an interfacial polymerization reaction, thereby forming elongated oil-core microcapsules.

Increasing the proportion of the oil phase, such as in Example 1, Table 3, produced more elongated microcapsules and microcapsules with larger aspect ratios, e.g., compared to Example 1, Table 2. It was found that the surfactant concentration in the water phase and the proportion of the oil phase in the emulsion has a significant effect on the amount of elongated oil-core microcapsules and their aspect ratios. Because the majority of elongated capsules are relatively larger, increasing the proportion of the oil phase increases the amount of larger oil-phase droplets, resulting in more elongated microcapsules and elongated microcapsules with larger aspect ratios.

Emulsion size is directly affected by the mixing speed, e.g., the higher the mixing speed, the smaller the dispersed oil-phase drops (e.g., oil-phase drop size). In an emulsion system with intermediate stability, e.g., resulting from the elimination of REAX 83A®, the droplets of the dispersed phase will start to coalesce to form bigger droplets. If the encapsulation occurs during the coalescence process, elongated microcapsules will be formed.

For example, in Example 1, Approach II, the water phase may be prepared by dissolving ATTAGEL® 40 in the water while stirring. For example, the water phase may comprise, consist of, or consist essentially of about 99.0 percent water and about 1.0 percent ATTAGEL® 40, where the percents are mass percents. The oil phase was prepared by adding CYMEL® U80 to toluene and ethanol and stirring, e.g., using the Powergen 500 homogenizer, until mixed. For example, the oil phase may comprise, consist of, or consist essentially of about 13.0 percent CYMEL® U80, about 60.9 percent toluene, and about 26.1 percent ethanol, where the percents are mass percents. The oil phase is dispersed into the water phase by stirring, e.g., using the Powergen 500 homogenizer at about 4000 rpm, to make the oil-in-water emulsion, e.g., where the oil-in-water emulsion comprises, consists of, or consists essentially of about 31 percent, by mass, oil phase and about 69 percent, by mass, water phase. The emulsion is then heated and a catalyst, such as 4N $H_2SO_4$, added to the heated emulsion to initiate a polymerization reaction. The emulsion is then mixed by a pulsed mixing process. For example, each pulse includes mixing the emulsion at about 15000 rpm for a particular time (e.g. a couple of minutes) and stopping mixing for a particular other time (e.g. about 10 minutes). The pulses are repeated until elongated microcapsules are formed.

A liquid drop can be deformed under shear conditions and it is possible to make elongated microcapsules from an emulsion under these conditions. For example, an emulsion may be placed between two surfaces moving at different velocities to cause the emulsion to flow as a shear flow. For example, one surface may be stationary, while the other is moving.

For one embodiment, elongated microcapsules were formed by placing an oil-in-water emulsion between a shaft rotating in a stationary tube, e.g., a tube closed at one of its ends, and the sidewall of the stationary tube, to produce a shear flow of the oil-in-water emulsion between the rotating shaft and the sidewall of the stationary tube. For example, in Example 2, an oil-in-water emulsion was formed from a water phase prepared by respectively dissolving xanthan gum, Petro BAF powder, and ATTAGEL® 40, in the water one at a time, while stirring. For example, the water phase may comprise, consist of, or consist essentially of about 97.7 percent water, about 0.1 percent xanthan gum, about 0.2 percent Petro BAF, and about 2.0 percent ATTAGEL® 40, where the percents are mass percents. The oil phase was prepared by adding CYMEL® U80 to toluene and stirring, e.g., using the Powergen 500 homogenizer, until mixed. For example, the oil phase may comprise, consist of, or consist essentially of about 26.3 percent CYMEL® U80 and about 73.7 percent toluene, where the percents are mass percents. The oil phase is dispersed into the water phase by stirring to make the oil-in-water emulsion, e.g., where the oil-in-water emulsion comprises, consists of, or consists essentially of about 43 percent, by mass, oil phase and about 57 percent, by mass, water phase. The oil-in-water emulsion was then added to the tube and the shaft was rotated within the tube, causing the oil-in-water emulsion to flow under shear between the rotating shaft and the sidewall of the tube. A catalyst, such as a five percent solution of $H_2SO_4$, was added to the oil-in-water emulsion as it flowed under shear to initiate the polymerization reaction, thereby forming elongated oil-core microcapsules. It was found that increasing the viscosity of the oil-in-water emulsion, e.g., by increasing the proportion of xanthan gum, resulted smaller oil-phase droplets in the emulsion and elongated microcapsules with higher aspect ratios.

For one embodiment, elongated microcapsules were formed by placing an oil-in-water emulsion between a rotating disc and a stationary plate, e.g., a stationary disc, to produce a shear flow of the oil-in-water emulsion between the rotating disc and stationary plate. For example, the oil-in-water emulsion comprised, consisted of, or consisted essentially of water phase with surfactants, such as xanthan gum, Petro BAF, and ATTAGEL® 40, and the oil phase included oil, such as toluene, with a shell forming pre-polymer, such as CYMEL® U80. The oil phase was added to the water phase to form the oil-in-water emulsion, and the oil-in-water emulsion was placed between the rotating disc and stationary plate, causing the oil-in-water emulsion to flow under shear. When the oil phase was flowing under shear, a catalyst, such as an acid catalyst, was added to flowing emulsion to initiate the polymerization reaction, thereby producing elongated microcapsules.

For some embodiments, the device of FIG. 9, e.g., an extruder, may be used to form elongated microcapsules by adjusting the space between the stationary barrel 252 and a rotating screw 251, as well as the rotating speed of the screw. The emulsion with the desired viscosity, pre-polymer, and catalyst can be added through the hopper 253. The microcapsules with complete walls can be collected at outlet (c). A feeding position 261 between the hopper and outlet (c) may be used for adding the catalyst, instead of at the beginning of the barrel via the hopper.

During operation, the emulsion flows with an angular component between the stationary barrel 252 and the rotating screw 251 under shear. This produces elongated microcapsules. Screw threads 262 move the emulsion as it is being sheared, and thus any elongated microcapsules formed by the shearing action, axially, are transported linearly in the direction from point (a) to point (c). For example, the axial flow may be perpendicular, e.g., substantially perpendicular, to the angular direction. That is, the emulsion and elongated microcapsules have angular and axial flow components as they move through the barrel.

During the shearing methods disclosed herein, heat is generated by shearing. An advantage of extruders is that heat is generated and dissipated (viscous dissipation) throughout the fluid volume. This is a source of heat that can be used for processing, thereby reducing the amount of heat that need to be added by heating the outside of the extruder. The shearing methods require a considerable amount of energy for the shearing, but the shearing itself also produces heat that may reduce the amount of heat needed to initiate the polymerization reaction or to reduce the viscosity.

The invention will now be illustrated by the following non-limiting examples.

EXAMPLES

For self healing functional materials, it is desirable to maximize the amount of liquid healing agents that can be delivered to the crack plane. One proposed way in which this can be accomplished is to use hollow tubes or fibers, while others are exploring more sophisticated micro-vascular networks. While those systems might be effective for specific applications, they are not a practical solution for coatings applications. One possible practical solution is to use microcapsules with high-aspect-ratios, or elongated microcapsules. Elongated microcapsules will have a more efficient healing ability, because an elongated microcapsule can release more healing agent than a spherical microcapsule when a crack is initiated in the coating.

Although the potential advantage of using elongated microcapsules for self healing applications is clear, it is difficult to make elongated microcapsules from an emulsion system, because spherical microcapsules are normally formed due to the interfacial tension between the dispersed phase and the continuous phase.

Two approaches were taken to synthesize elongated microcapsules. The first method used an emulsion with intermediate stability. The second method involved applying shear condition to the emulsion. The experimental details are presented here.

Example 1

Elongated Microcapsule Synthesis by Emulsion of Intermediate Stability

Approach I

Elongated microcapsules were formed for the first time unintentionally. An oil core pH sensitive microcapsule formula was modified. Table 1 shows the regular oil core pH sensitive microcapsule formula.

Table 1 shows a formula (A) that was modified. Two changes were made in this formula. The wall forming material is the prepolymer (U80) without any crosslinker (PTT). We found it formed a thin and brittle wall, which is easy to break mechanically to release its content. The formula also eliminated one of the surfactants, Reax83A, which results in a more viscous, yet less stable emulsion.

TABLE 1

An oilcore microcapsule formula.

| Phases | Chemical Reagents | Amount (grams) |
| --- | --- | --- |
| Oil Phase | U80 | 1.5 |
|  | PTT | 1.5 |
|  | Toluene | 14 |
|  | Ethanol | 6.4 |
| Water Phase | Water | 50 |
|  | Xanthan Gum | 0.05 |
|  | Petro BAF | 0.1 |
|  | Attagel 40 | 1 |
|  | Reax 83A | 1.28 |

TABLE 2

Microcapsule formula A, modified for self healing function.

| Phases | Reagents | Amount (grams) |
| --- | --- | --- |
| Oil Phase | U80 | 3 |
|  | Toluene | 14 |
|  | Ethanol | 6.4 |
| Water Phase | Water | 50 |
|  | Xanthan Gum | 0.05 |
|  | Petro BAF | 0.1 |
|  | Attagel 40 | 1 |

Figure 10:
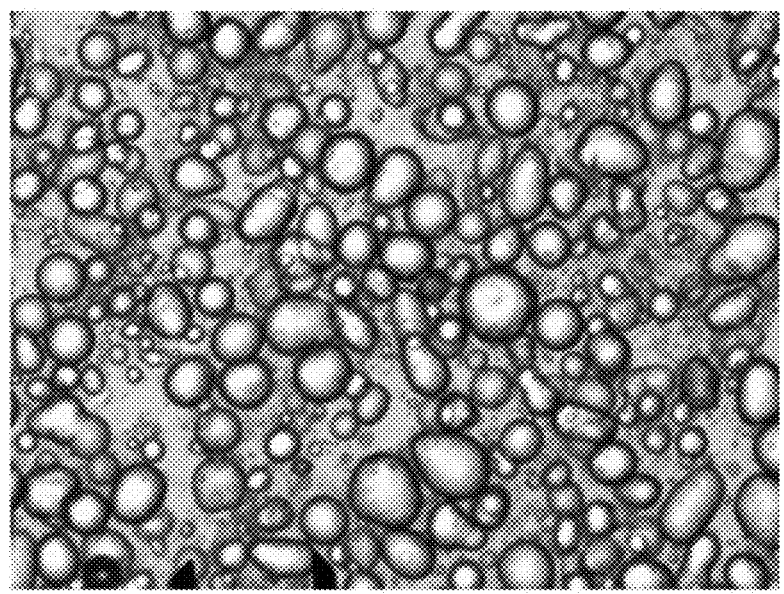
FIG. 10 is a photomicrograph of elongated microcapsules made in one experiment. Size bar 50 microns.

Formula A resulted in elongated microcapsules, as shown in FIG. 10. More recently, the experiment was repeated and a closer look revealed more elongated and some odd shaped microcapsules (shown in FIG. 11).

Figure 11:
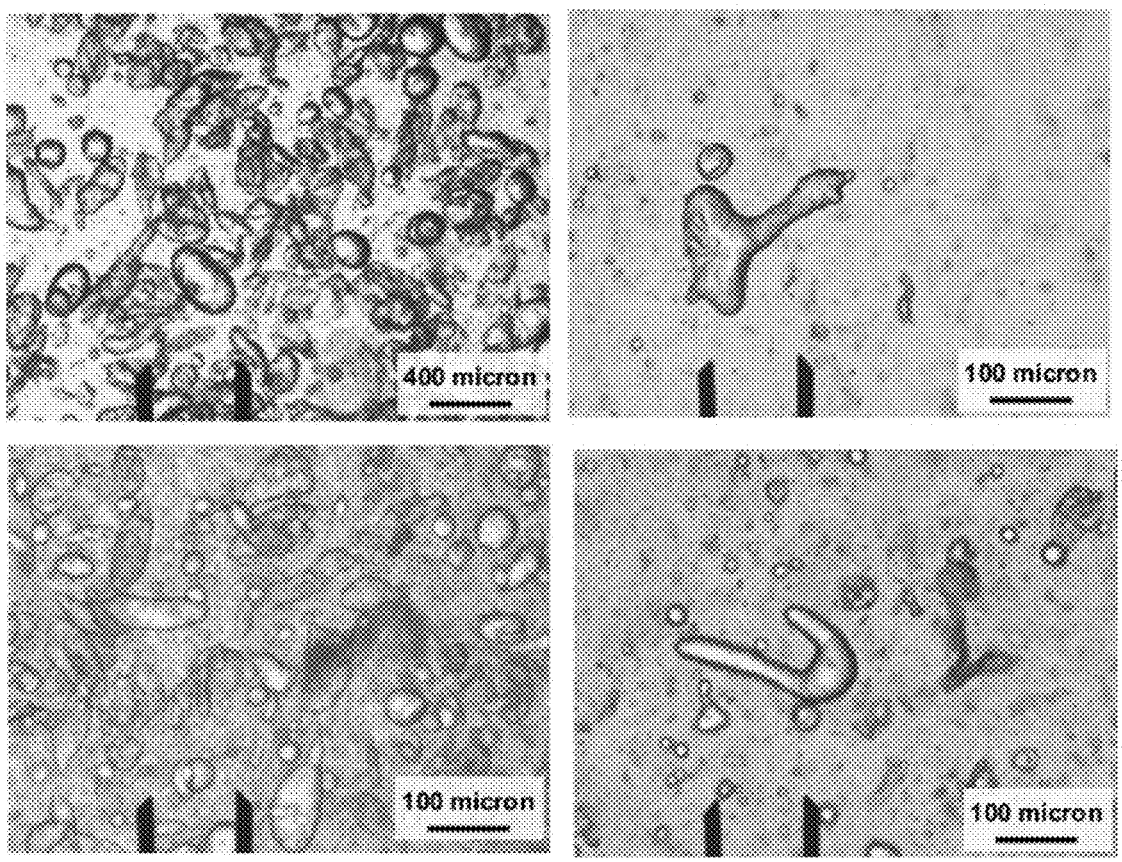
FIG. 11 is a photomicrograph of elongated microcapsules made in another experiment.

Several factors contributed to the formation of elongated microcapsules when using Formula A. First, the formula provides a thin and somewhat brittle wall, making the microcapsule more susceptible to break by mixing during the encapsulation process. Second, the change in surfactants resulted in an unstable and viscous emulsion with various size droplets in the emulsion that are constantly forming, deforming, and breaking. Under these conditions, some bigger oil droplets were deformed into elongated shapes that lasted long enough (as the continuous phase is viscous) to form the capsule wall. Some capsules are also broken after the capsule walls are formed and release some of the prepolymer to form tail-like structures, as shown in FIG. 11.

Figure 12:
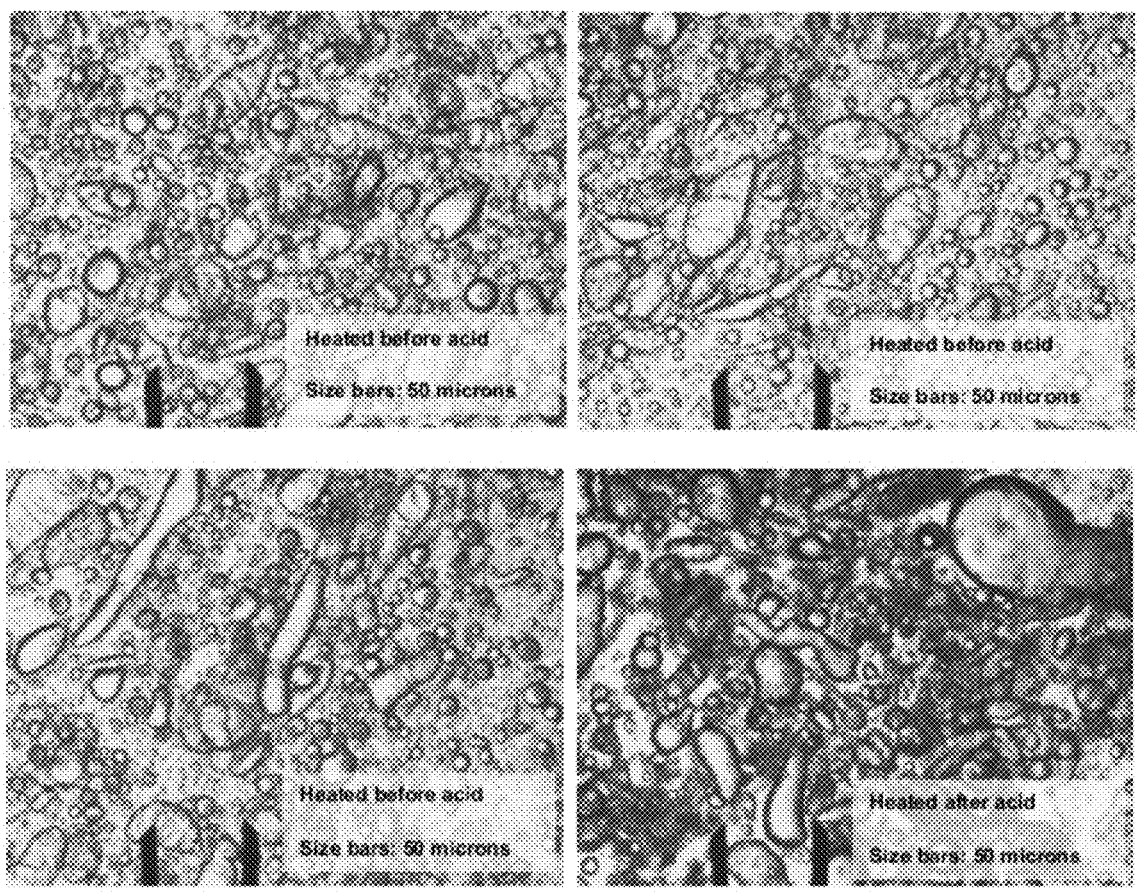
FIG. 12 is a photomicrograph of elongated microcapsules made in another experiment.

Because the majority of elongated capsules are relatively bigger, formula A was further modified by increasing the oil phase to increase the amount of bigger oil droplets. The new formula, B, is shown in Table 3. This formula resulted in more elongated microcapsules as well as a higher aspect ratio of these microcapsules, as shown in FIG. 12.

TABLE 3

Formula B for elongated microcapsules

| Phases | Reagents | Amount (grams) |
|---|---|---|
| Oil Phase | U80 | 10 |
|  | Toluene | 28 |
| Water Phase | Water | 50 |
|  | Gum | 0.05 |
|  | BAF | 0.1 |
|  | Attagel | 1 |

In order to find the best formula for making elongated microcapsules, oil phase composition, water phase composition, as well as water/oil ratio were tested for their influence on the process. Results showed that the oil phase composition has a very small effect while the water-phase composition (surfactant concentration in the water phase), as well as the water/oil ratio have a more significant effect on the process.

Approach II

In the last section, a process to synthesize elongated microcapsules was described in which the capsule walls are formed while bigger droplets are deformed or when bigger capsules break and release unreacted pre-polymer to form a tail-like structure. There is a slightly different approach to make elongated microcapsules.

As mentioned earlier, the emulsion size is directly affected by the mixing speed: the higher the mixing speed, the smaller the dispersed phase drop size. In an emulsion system with intermediate stability, the droplets of the dispersed phase will start to coalesce to form bigger droplets. If the encapsulation occurs during the coalescence process, elongated microcapsules will be formed.

Figure 13:
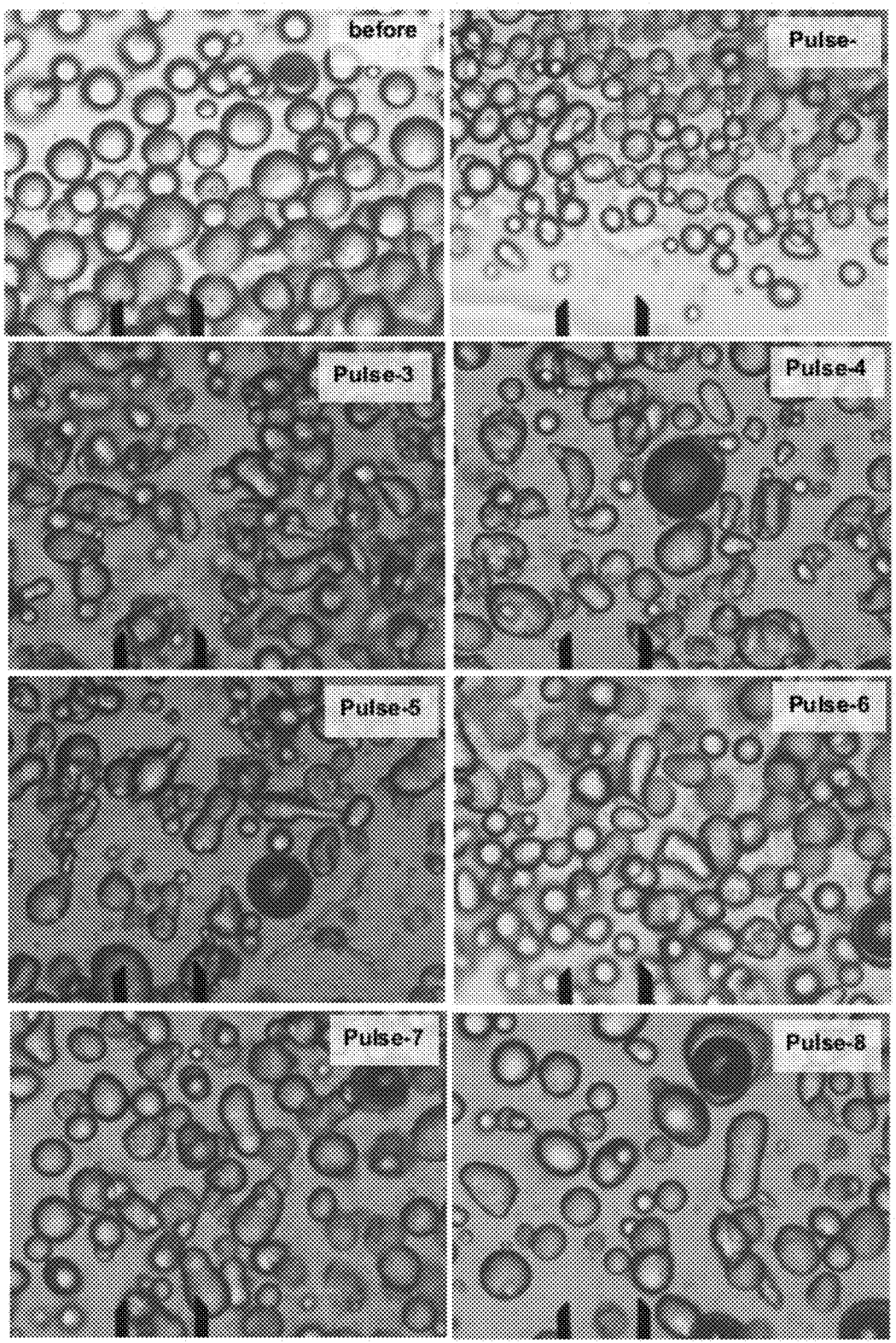
FIG. 13 is a photomicrograph of elongated microcapsules made in another experiment.

FIG. 13 shows the result of an experiment that was planned to use this approach to form elongated microcapsules. The emulsion formula is as follows: oil phase (3 g U80, 14 g Toluene, 6 g ethanol) and water phase (0.5 g Attagel, 50 g water). The emulsion was formed by using a high speed homogenizer (Powergen 500, Fisher Scientific) at a low setting (~4000 rpm). The polymerization process was then initiated by heating the emulsion to approximately 70° C. and adding acid catalyst dropwise until the pH was about 1 or 0. This was followed by increasing the mixing speed to high (~15000 rpm) and stopping. The pulse process was repeated (mixing at high speed and stopping) several times until elongated capsules were formed. The smaller droplets tend to combine again when the mixing stops. If the wall forms during the combination process, the shape of two droplets coalescing is kept. FIG. 13 shows some of the microcapsules formed by this process as well as those with tail-like structures.

Summary

Generally, in order to make elongated microcapsules, it is desirable to have an emulsion with an intermediate stability. An emulsion formula that is very stable can be easily obtained with mixing, results in a homogenous droplet size distribution, and stays in that stage for a long time. A very unstable emulsion will undergo phase separation as soon as the mixing stops. An emulsion with an intermediate stability will go through a relatively long transition period before the final phase separation. While a stable emulsion will result in perfectly spherical microcapsules, a very unstable emulsion will undergo phase separation too soon for the encapsulation process to occur. An emulsion with intermediate stability will go through coalescence and other deformation processes during encapsulation to form elongated and other non-spherically shaped microcapsules.

Other important emulsion properties to consider include surface tension and viscosity of the emulsion system. The higher the surface tension between the dispersed phase and the continuous phase, the more likely it is for the dispersed phase to maintain its spherical shape; the lower the viscosity of the continuous phase, the faster it is for a deformed droplet to recover its spherical shape. Therefore, lower surface tension and higher viscosity are preferred to form elongated microcapsules.

Example 2

Elongated Microcapsule Synthesis by Shear Flow in Emulsion

While the previous processes were successful in making elongated microcapsules, the processes are not highly effective and difficult to control.

Two main forces, the interfacial stress (surface tension) and the viscous force (shear caused by flow) determine the deformation and stability of a droplet in a shear field (or flowing liquid phase). When a naturally buoyant drop is subjected to a local straining rate, the steady state deformation is the result of the equilibrium between the viscous forces, which tend to deform the drop and even break it, and the interfacial force, which attempts to recover the initial spherical shape.

A parallel band apparatus as shown in FIG. 7 provides simple shear conditions that deform a droplet 141 located between bands 211 when the two bands 211 are moving in opposite directions. It is possible to make elongated microcapsules from an emulsion under these conditions.

To envision the geometry of the experimental set up for simple shear conditions, simple shear viscometers come to mind. Simple shear rheometers or viscometers are high-precision, continuously-variable-shear instruments in which the test fluid is sheared between rotating cylinders, cones, or plates, under controlled-stress or controlled-rate conditions. Most rheometers depend on the relative rotation about a common axis of one of three tool geometries: concentric cylinder, cone and plate, or parallel plates (See FIG. 8).

The concentric cylinder and parallel plate geometries were chosen to be tested for the creation of elongated microcapsules.

Concentric Cylinder

A crude version of a concentric cylinder was set up using a mixer shaft rotating inside a centrifuge tube. While the gap between the wall of the centrifuge tube and the mixer rod might be slightly larger for an ideal concentric cylinder, the experimental results were promising.

The starting water phase and oil phase compositions are shown in Table 4. 10 ml oil phase was added to 30 ml of the water phase to form the oil in water emulsion. 5 ml of the emulsion was added to a 15 ml centrifuge tube. A Servodyne mixer with a shaft (⅜" diameter) was used to provide the shear condition in the emulsion, and 5% sulfuric acid was added dropwise until the pH is about 1 or 0 to initiate the polymerization reaction to form the capsule wall.

Figure 14:
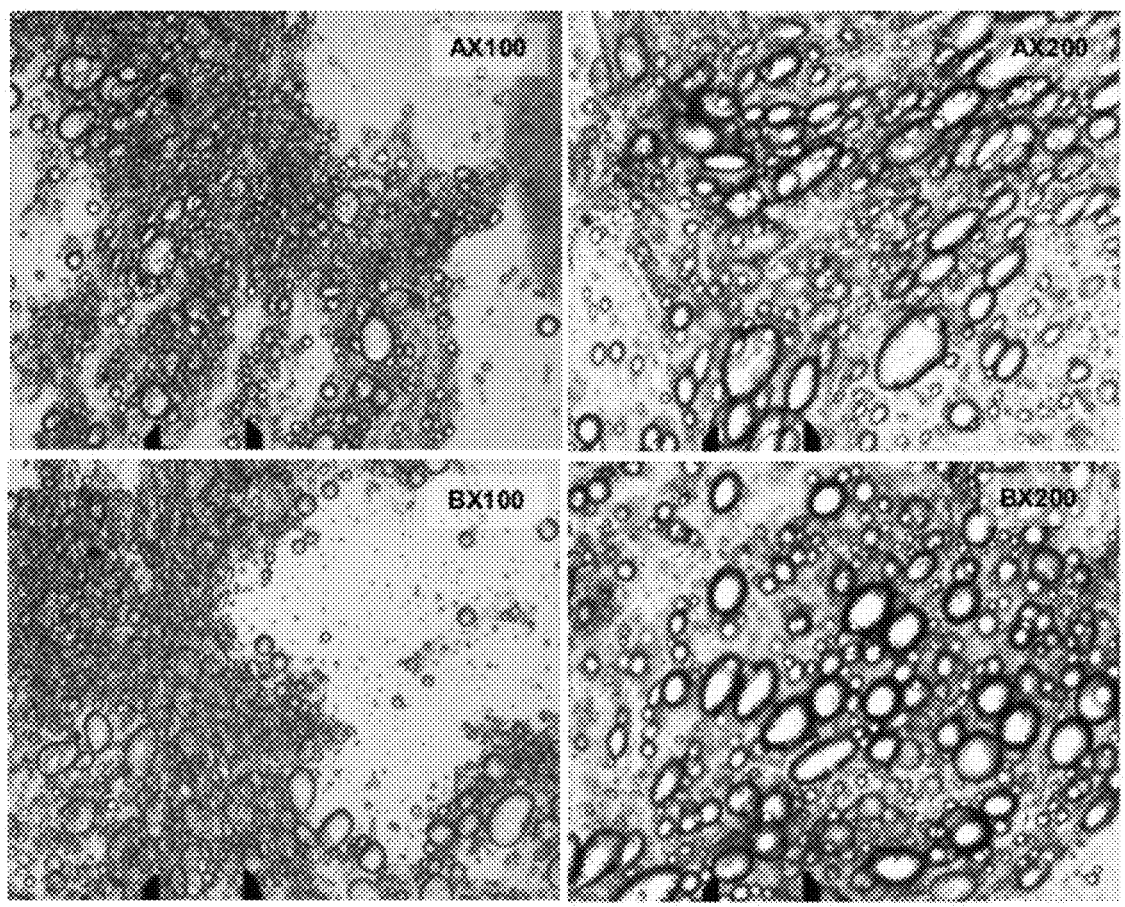
FIG. 14 is a photomicrograph of elongated microcapsules made in another experiment. Size bars on panels with AX100 or BX100 are 100 microns. Size bars on panels with AX200 or BX200 are 50 microns.

The results are shown in the pictures in FIG. 14. As the pictures show, the bigger capsules were elongated and only some of the small ones remain spherical. The sample is not very homogenous and there are clusters of microcapsules where they seem more likely to be elongated in shape. It is possible that the cluster formation is due to the shear conditions that also elongate the microcapsules.

TABLE 4

Starting water phase and oil phase composition.

| Phases | Reagents | Amount (grams) |
| --- | --- | --- |
| Oil Phase | U80 | 20 |
|  | Toluene | 56 |
| Water Phase | Water | 100 |
|  | Gum | 0.1 |
|  | BAF | 0.2 |
|  | Attagel | 2 |

This experiment was repeated and the amount of gum added was adjusted to vary the viscosity. The starting water phase and oil phase are the same (shown in the table above). 0.25, 0.5, 0.75, and 1 gram of gum were added into 30 ml of the water phase (starting formula) to form a very viscous water phase, and then 10 ml oil phase were added to the water to form the oil-in-water emulsion. The Powergen homogenizer was used for mixing.

Figure 15A:
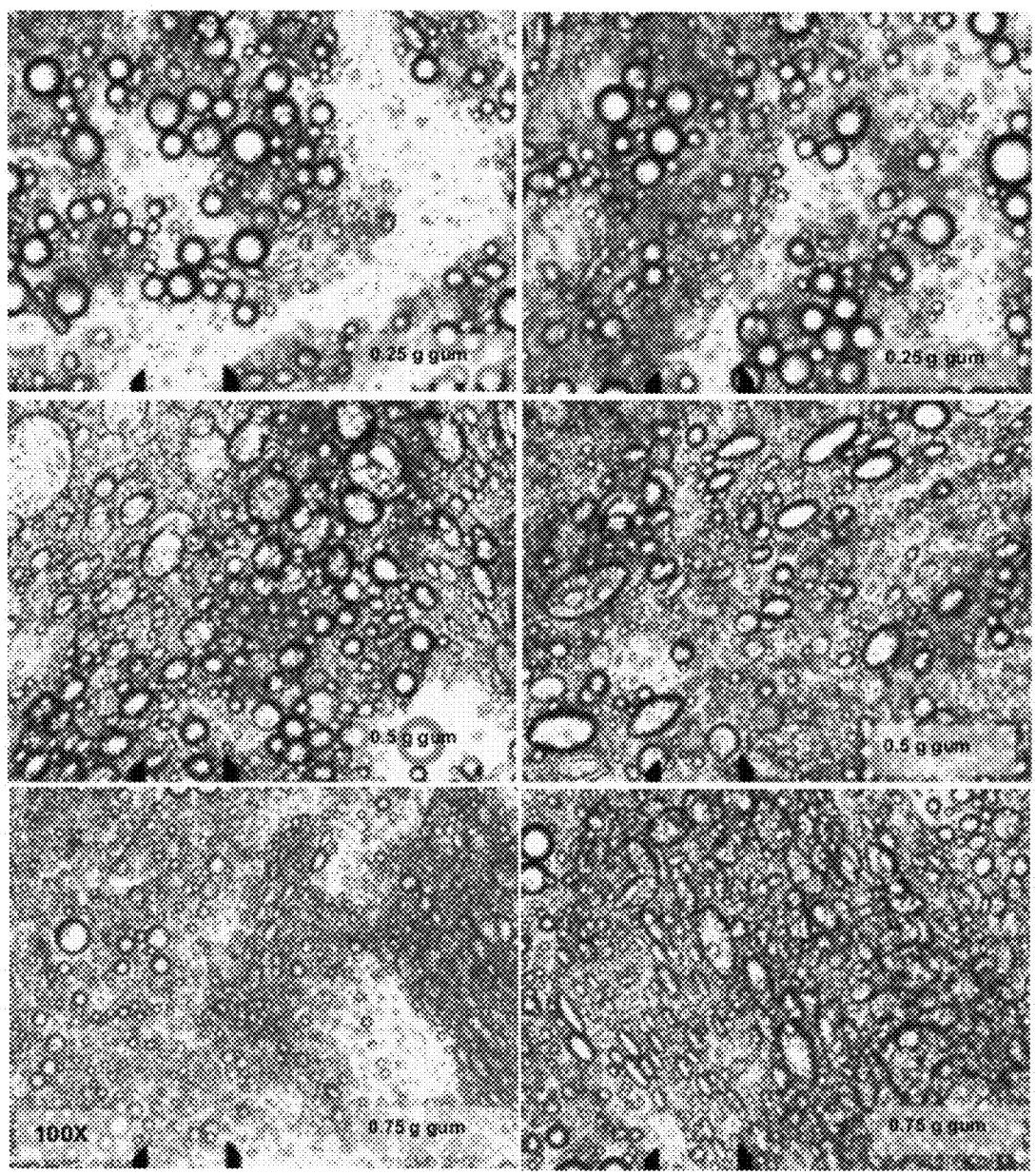
FIG. 15 is a photomicrograph of elongated microcapsules made in another experiment. Size bar on the panel with 100X is 100 microns. All other size bars are 50 microns.
Figure 15B:
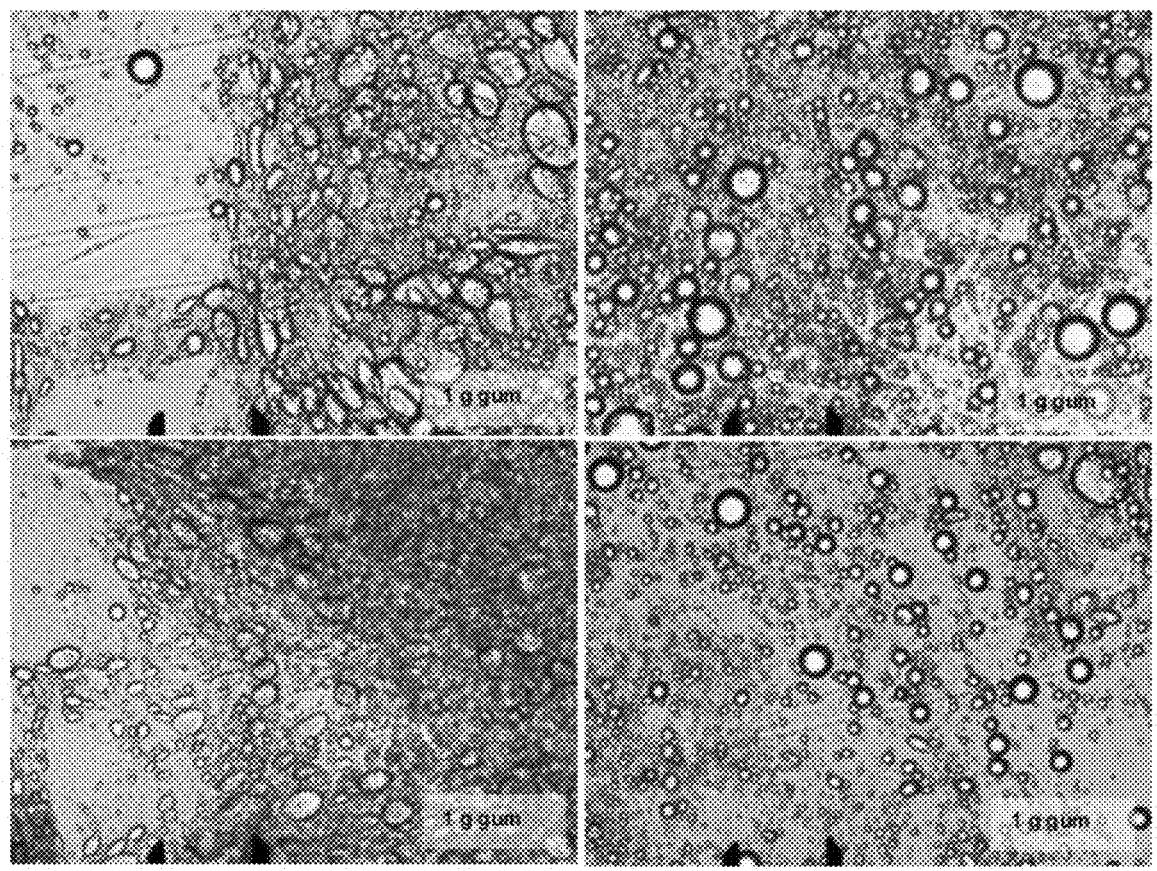

5 ml of the emulsion was added into a 15 ml centrifuge tube. A Servodyne mixer with a ⅜" diameter shaft was used to provide the shear in the emulsion. 5% sulfuric acid was then added to initiate the polymerization reaction to form the capsule wall. The results are shown in FIGS. 15a and 15b. The viscosity, or the amount of gum, clearly had an important effect on the emulsion and the elongation of the capsules. More gum seems to form smaller droplets in the emulsion, and/or higher aspect ratio capsules.

Parallel Plate

A crude version of a parallel concentric cylinder was set up using a polishing machine (Struers, TegraPol-11). The polishing machine provides the plate that rotates at a controllable speed and another plate was held above the rotating plate, while the emulsion was placed between the two plates. The emulsion included the water phase with surfactants and the oil phase with a wall-forming pre-polymer. After the steady state was reached, acid was added to the emulsion to initiate the polymerization reaction that forms the capsule wall.

Figure 16:
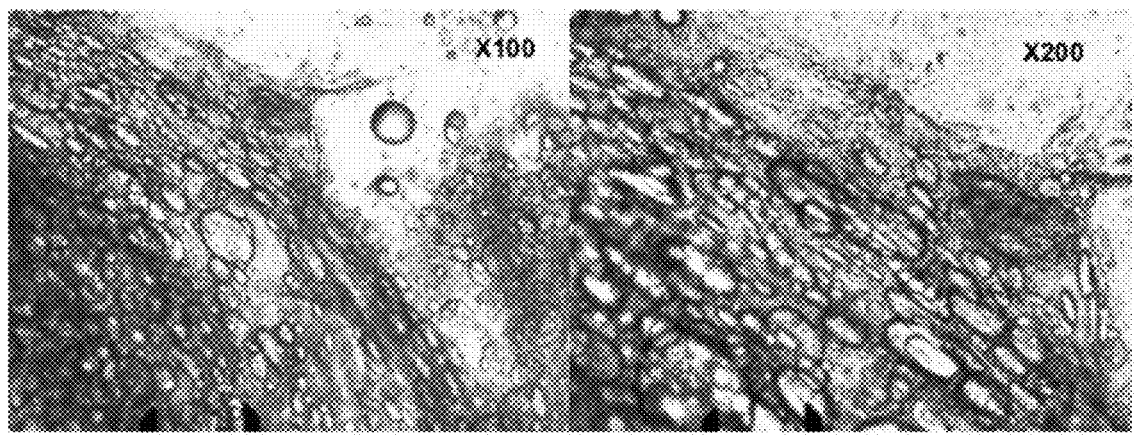
FIG. 16 is a photomicrograph of elongated microcapsules made in another experiment. Size bar on the panel with X100 is 100 microns. Size bar on the panel with X200 is 50 microns.

The resulting microcapsules are shown in the pictures in FIG. 16. The pictures show that elongated microcapsules with high-aspect ratio were formed.

Synthesizing Elongated Microcapsules through Continuous Production Operation

Two geometries were tested for simple shear conditions: concentric cylinders and parallel plates. In both setups, the dispersed phase (liquid droplets with wall-forming prepolymer inside) was deformed under simple shear conditions. Then, a catalyst was added to trigger the polymerization reaction to form the capsule wall. While both geometries were successful in making elongated microcapsules, they were difficult to scale up for a continuous production operation.

To satisfy both the simple shear condition and continuous production, the emulsion should be placed between two surfaces that are moving at different velocities. At the same time, the emulsion should be transported from a starting position to a finish position during the wall formation reaction so that the microcapsules with complete walls can be collected at the finish position continuously.

Among the two simple shear geometries tested, the concentric cylinder design can be modified to satisfy the continuous operation condition. For concentric cylinders, there are two cylinder surfaces moving at different velocities. One design would include a stationary outside cylinder while the inside cylinder rotates. The emulsion is moving in an angular direction between the two cylinders. In order for the emulsion to move linearly from a starting point to a finishing point while it is under simple shear conditions, the emulsion needs to move in both angular and axial directions. A natural design for this process is a screw and barrel design.

A well-known design already exists and is used in the polymer industry: the polymer extruder (FIG. 9). It is possible to create the simple shear conditions that are needed to form elongated microcapsules by adjusting the space between the barrel and screw, as well as the rotating speed of the extruder. The emulsion with the desired viscosity, pre-polymer, and catalyst can be added at the hopper 253. The microcapsules with complete walls can be collected at the die 211. It is also possible to add a feeding position 261 in the middle of the barrel, so that the catalyst can be added there, instead of at the beginning of the barrel. The polymer extruder design can be easily adapted to form elongated microcapsules under continuous operation.

Conclusion

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any adaptations or variations of the invention. It is manifestly intended that this invention be limited only by the following claims and equivalents thereof.

We claim:

1. A composition comprising capsules having a solid shell and an interior core; wherein at least a portion of the capsules are elongated microcapsules having an aspect ratio greater than 1.3 and wherein the shorter axis is less than 400 microns,
   (a) wherein the elongated microcapsules are formed by a process comprising:
      forming an emulsion;
      stirring the emulsion using pulsed stirring; and
      forming solid shells around droplets in the emulsion to form elongated microcapsules; or
   (b) wherein the elongated microcapsules are formed by a process comprising:
      forming an emulsion;
      shearing the emulsion between two surfaces moving at different velocities to form a sheared emulsion; and
      forming solid shells around droplets in the emulsion to form elongated microcapsules.

2. The composition of claim 1 wherein the interior core of the elongated microcapsules comprises a colorimetric or fluorescent indicator that changes color or fluoresces when exposed to corrosion or the interior core comprises a corrosion inhibitor, a film-forming compound, or a self-healing compound.

3. The composition of claim 1 wherein the interior core of the elongated microcapsules comprises a colorimetric or fluorescent indicator that changes color or fluoresces when exposed to alkaline pH.

4. The composition of claim 1 wherein the composition is adapted to release the interior core of the microcapsules in response to physical trauma and wherein the interior core of the elongated microcapsules comprises a colorimetric or fluorescent indicator that changes color or fluoresces when exposed to corrosion or comprises a corrosion inhibitor, film-forming compound, or self-healing compound.

5. The composition of claim 1 wherein the composition is a coating composition adapted to cover and adhere to a metal-containing surface.

6. The composition of claim 5 wherein the composition is an adherent coating on a metal-containing surface.

7. The composition of claim 1 wherein the solid shell does not break down under alkaline condition.

8. The composition of claim 1 wherein the shell breaks down when exposed to an alkaline condition.

9. The composition of claim 1 wherein the solid shell comprises polymer strands interconnected with each other by a cross-linker, wherein the cross-linker hydrolyzes in an alkaline condition.

10. The composition of claim 1 wherein at least 50 volume percent of the capsules are elongated microcapsules.

11. A method for forming elongated microcapsules, comprising:
    forming an emulsion;
    shearing the emulsion between two surfaces moving at different velocities to form a sheared emulsion; and
    forming solid shells around droplets in the emulsion to form elongated microcapsules.

12. The method of claim 11 further comprising:
    transporting the mixture in space from point a to point b to point c, wherein the sheared emulsion is formed between points a and c;
    treating the sheared emulsion at point a or b to initiate formation of the solid shells; and
    harvesting elongated microcapsules at point c.

13. The method of claim 12 wherein the step of treating the sheared emulsion comprises adding an initiator to the sheared emulsion at point b to initiate formation of the solid shells.

14. The method of claim 11 wherein the two surfaces moving at different velocities are a screw inside a barrel, wherein the screw and barrel rotate relative to each other.

15. The method of claim 11 further comprising:
    harvesting the elongated microcapsules; and
    mixing the elongated microcapsules with one or more other components to form an adherent coating composition.

16. The method of claim 11, wherein the two surfaces moving at different velocities are selected from the group consisting of a rotating shaft and a stationary tube, a rotating disc and a stationary plate, a rotating cone and a stationary plate or cone, and a rotating screw and a stationary barrel.

17. The method of claim 11 wherein the emulsion comprises hydrophobic droplets dispersed in a hydrophilic phase.

18. The method of claim 11, wherein the emulsion comprises hydrophilic droplets dispersed in a hydrophobic phase.

19. A method for forming elongated microcapsules, comprising:
    forming an emulsion;
    stirring the emulsion using pulsed stirring; and
    forming solid shells around droplets in the emulsion to form elongated microcapsules.

20. The method of claim 19 further comprising:
    harvesting the elongated microcapsules; and
    mixing the elongated microcapsules with one or more other components to form an adherent coating composition.

21. The method of claim 19 wherein the method forms capsules having a solid shell and an interior core, wherein a portion or all of the capsules are elongated microcapsules.

22. The method of claim 19 wherein at least 50 volume percent of the capsules are elongated microcapsules.

23. The method of claim 19, wherein the pulsed stirring comprises repeating a process of mixing the emulsion for a particular time and stopping or slowing mixing for a particular other time.

24. The method of claim 19, wherein the emulsion comprises hydrophobic droplets dispersed in a hydrophilic phase.

25. The method of claim 19, wherein the emulsion comprises hydrophilic droplets dispersed in a hydrophobic phase.

* * * * *